(12) United States Patent
    Anno

(10) Patent No.: US 11,614,902 B2
(45) Date of Patent: Mar. 28, 2023

(54) JOB PROCESSING SYSTEM, METHOD FOR CONTROLLING THE SAME, AND STORAGE MEDIUM

(71) Applicant: CANON KABUSHIKI KAISHA, Tokyo (JP)

(72) Inventor: Makoto Anno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/182,848

(22) Filed: Feb. 23, 2021

(65) Prior Publication Data
    US 2021/0279013 A1    Sep. 9, 2021

(30) Foreign Application Priority Data

Mar. 9, 2020 (JP) .............................. JP2020-040216

(51) Int. Cl.
    G06F 3/12       (2006.01)
    G06T 7/00       (2017.01)
(52) U.S. Cl.
    CPC .......... G06F 3/1208 (2013.01); G06F 3/1204 (2013.01); G06F 3/1275 (2013.01); G06T 7/0004 (2013.01)
(58) Field of Classification Search
    CPC combination set(s) only.
    See application file for complete search history.

(56) References Cited

U.S. PATENT DOCUMENTS

| 2012/0019852 A1* | 1/2012 | Ito ...................... G06K 15/027 |
| | | 358/1.13 |
| 2013/0301067 A1* | 11/2013 | Nakamura ........ H04N 1/00082 |
| | | 358/1.13 |
| 2015/0356717 A1* | 12/2015 | Madden ............ H04N 1/00005 |
| | | 358/1.6 |
| 2017/0300275 A1* | 10/2017 | Steux .................... G06F 3/1282 |
| 2019/0385293 A1* | 12/2019 | Trachanas ......... H04N 1/00246 |
| 2020/0177763 A1* | 6/2020 | Kubo ................ H04N 1/00238 |
| 2020/0356318 A1* | 11/2020 | Wei ....................... G06F 3/1207 |
| 2021/0149609 A1* | 5/2021 | Kikuchi ................. G06F 3/126 |

FOREIGN PATENT DOCUMENTS

JP      2014-235678 A     12/2014

* cited by examiner

Primary Examiner — Helen Zong
(74) Attorney, Agent, or Firm — Canon U.S.A., Inc. IP Division

(57) ABSTRACT

There is provided a method for notifying an operator of necessity of implementation of an inspection to be manually performed by the operator. A method for controlling a job processing system that causes a job processing apparatus to execute a job, the method includes receiving required quality data, and notifying, based on the required quality data received in the receiving, a user that an output product output by executing the job needs to be inspected by an inspection apparatus.

20 Claims, 14 Drawing Sheets

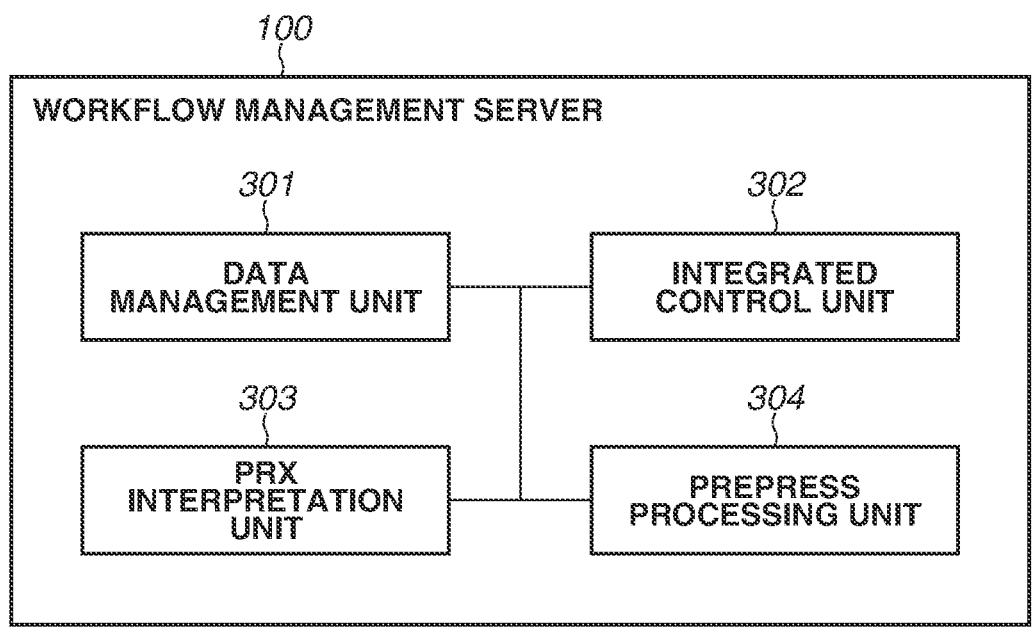

FIG.4

```
<PRX> [411]
    <PRXInfo>...</PRXInfo>
    <BuyerInfo>...</BuyerInfo>
    <EvaluationInfo>...</EvaluationInfo>
    <QualitySpecification> [412]
        <QualitySpecName>...</QualitySpecName>
        <QualitySpecVersion>...</QualitySpecVersion>
        <CustomerJob> [413]
            <JobTypeName>...</JobTypeName>
            <Brand>...</Brand>
            <Product>...</Product>
            <QualityGoals> [414]
                <Color>...</Color>                    [415]
                <Registration>...</Registration>      [416]
                <Defects>...</Defects>                [417]
                <Barcode>...</Barcode>                [418]
            </QualityGoals>
        </CustomerJob>
    </QualitySpecification>
    <CxFReferenceData>...</CxFReferenceData>
    <SamplingPositionImageData>...</SamplingPositionImageData
</PRX>
```

FIG.5

```xml
<Color> 415
    <ComplianceGoal>ISO 12641-1</ComplianceGoal>
    <ComplianceGoal>G7</ComplianceGoal> 421
    <ColorScore> 422
        <ScoringInfo> 423
            <MinimumAcceptableRank>3</MinimumAcceptableRank> 424
            <DesiredRank>4</DesiredRank>                    425
        </ScoringInfo>
        <ColorScoringScale ScoringInput="ColorDifference"> 426
            <UoM>dE</UoM> 427
            <ParameterScore DisplayLabel="B" Rank="4"> 428
                <ValueRange>
                    <LogicalOperator>LTE</LogicalOperator> 429
                    <CalculatedValue>5</CalculatedValue>   42a
                </ValueRange>
            </ParameterScore>
            <ParameterScore DisplayLabel="C" Rank="3"> 42b
                <ValueRange>
                    <LogicalOperator>LTE</LogicalOperator>
                    <CalculatedValue>10</CalculatedValue>
                </ValueRange>
            </ParameterScore>
        </ColorScoringScale>
    </ColorScore>
</Color>
```

FIG.6

```xml
<Registration> (416)
    <RegistrationScore> (431)
        <ScoringInfo> (432)
            <BasisOfCalculation>...</BasisOfCalculation>
            <MinimumAcceptableRank>7</MinimumAcceptableRank> (433)
            <DesiredRank>8</DesiredRank> (434)
        </ScoringInfo>
        <RegistrationScoringScale ScoringInput="LinearVariance"> (435)
            <UoM>um</UoM> (436)
            <ParameterScore DisplayLabel="Excellent" Rank="8"> (437)
                <ValueRange> (438)
                    <LogicalOperator>LT</LogicalOperator>            (43a)
                    <CalculatedValue>2</CalculatedValue>              (43b)
                    <LogicalConnector>AND</LogicalConnector>          (43c)
                    <LogicalOperator>GTE</LogicalOperator>            (43d)
                    <CalculatedValue>1</CalculatedValue>              (43e)
                </ValueRange>
            </ParameterScore>
            <ParameterScore DisplayLabel="Good" Rank="7"> (43f)
                <ValueRange>
                    <LogicalOperator>LTE</LogicalOperator>
                    <CalculatedValue>4</CalculatedValue>
                    <LogicalConnector>AND</LogicalConnector>
                    <LogicalOperator>GTE</LogicalOperator>
                    <CalculatedValue>2</CalculatedValue>
                </ValueRange>
            </ParameterScore>
        </RegistrationScoringScale>
    </RegistrationScore>
    <CalculationVariable>...</CalculationVariable>
    <RegistrationParameter>...</RegistrationParameter>
</Registration>
```

FIG.7

```xml
<Defects> 417
    <ScoringInfo> 441
        <MinimumAcceptableRank>7</MinimumAcceptableRank> 442
        <DesiredRank>8</DesiredRank> 443
    </ScoringInfo>
    <DefectTypeDefinition> 444
        <DefectName>hickey</DefectName> 445
        <Definition>Imperfection in a print image caused by debris</Definition> 446
    </DefectTypeDefinition>
    <DefectTypeDefinition>
        <DefectName>line</DefectName> 447
        <Definition>Imperfection in a print image that appears as a thin horizontal line</Definition>
    </DefectTypeDefinition>
    <DefectParameter> 448
        <DefectParameterScale ScoringInput="LinearMeasure"> 449
            <UoM>um</UoM> 44a
            <ParameterScore DisplayLabel="Excellent" Rank="8"> 44b
                <ValueRange> 44c
                    <LogicalOperator>LT</LogicalOperator>         44d
                    <CalculatedValue>3</CalculatedValue>          44e
                    <LogicalConnector>AND</LogicalConnector>      44f
                    <LogicalOperator>GTE</LogicalOperator>        44g
                    <CalculatedValue>1</CalculatedValue>          44h
                </ValueRange>
            </ParameterScore>
            <ParameterScore DisplayLabel="Good" Rank="7"> 44i
                <ValueRange>
                <LogicalOperator>LTE</LogicalOperator>
                <CalculatedValue>4</CalculatedValue>
                <LogicalConnector>AND</LogicalConnector>
                <LogicalOperator>GTE</LogicalOperator>
                <CalculatedValue>3</CalculatedValue>
                </ValueRange>
            </ParameterScore>
        </DefectParameterScale>
    </DefectParameter>
</Defects>
```

FIG.8

```
<Barcode>  ⟨418⟩
    <ComplianceGoal>ISO 15426-1</ComplianceGoal>  ⟨451⟩
    <BarcodeScore>  ⟨452⟩
        <ScoringInfo>  ⟨453⟩
            <BasisOfCalculation>...</BasisOfCalculation>
            <MinimumAcceptableRank>1</MinimumAcceptableRank>  ⟨454⟩
            <DesiredRank>1</DesiredRank>  ⟨455⟩
        </ScoringInfo>
        <BarcodeScoringScale ScoringInput="ISOVerification">  ⟨456⟩
            <Score DisplayLabel="Pass" Rank="1"/>  ⟨457⟩
        </BarcodeScoringScale>
    </BarcodeScore>
    <CalculationVariable>B</CalculationVariable>
    <BarcodeParameter>  ⟨458⟩
        <BarcodeSymbology>Code128</BarcodeSymbology>  ⟨459⟩
        <CustomerItemIdLink>CI002</CustomerItemIdLink>
        <SamplingPosition>...</SamplingPosition>
        <CalculationVariable>BA</CalculationVariable>
    </BarcodeParameter>
</Barcode>
```

FIG.9A

```
<PQX> 511
    <SampleCollection> 512
        <Sample> 513
            <ColorReport>...</ColorReport>           514
            <RegistrationReport>...</RegistrationReport>  515
            <DefectReport>...</DefectReport>          516
            <BarcodeReport>...</BarcodeReport>        517
        </Sample>
    </SampleCollection>
</PQX>
```

FIG.9B

```
<BarcodeReport> 517
    <VerificationSet> 551
        <CustomerItemIdLink>SKU1234</CustomerItemIdLink>
        <PositionOnSample PositionLabel="BackRightMargin">1</PositionOnSample>
        <Barcode1DEntry> 552
            <BarcodeSymbology>UPC-A</BarcodeSymbology> 553
            <ReporterIdLink>OID002</ReporterIdLink>
            <ISO1DVerification> 554
                <OverallSymbolGrade>2.0/06/660</OverallSymbolGrade>  555
                <MinimumReflectance ISONumericReporting="4.0" />    556
                <SymbolContrast ISONumericReporting="2.0" />        557
                <MinimumEdgeContrast ISONumericReporting="4.0" />   558
                <Modulation ISONumericReporting="4.0" />            559
                <BarcodeDefects ISONumericReporting="3.0" />        55a
                <Decodability ISONumericReporting="4.0" />          55b
                <Decode>pass</Decode>                               55c
            </ISO1DVerification>
        </Barcode1DEntry>
    </VerificationSet>
</BarcodeReport>
```

FIG.10

INSPECTION LIST

| | 611 | 612 | 613 |
|---|---|---|---|
| JOB ID | NRT20190123-005 | NRT20190123-006 | NRT20190123-007 |
| PRINTER | Printer-01 | Printer-03 | Printer-02 |
| BARCODE | IMPLEMENTATION REQUIRED | IMPLEMENTATION NOT REQUIRED | IMPLEMENTATION NOT REQUIRED |
| IMAGE DEFECT | IMPLEMENTATION REQUIRED | IMPLEMENTATION REQUIRED | IMPLEMENTATION REQUIRED |
| TINT | INLINE IMPLEMENTATION | IMPLEMENTATION REQUIRED | IMPLEMENTATION NOT REQUIRED |
| POSITIONAL SHIFT | IMPLEMENTATION NOT REQUIRED | INLINE IMPLEMENTATION | IMPLEMENTATION REQUIRED |

(columns 614, 615, 616 indicated above data columns)

FIG.11A

| INSPECTION INSTRUCTION SHEET | | ← 620 |
|---|---|---|
| \*NRT20190123-005\* (barcode) | | ← 621 |
| JOB ID | NRT20190123-005 | ← 622 |
| PRINTER | Printer-01 | ← 623 |
| BARCODE | IMPLEMENTATION REQUIRED | ← 624 |
| IMAGE DEFECT | IMPLEMENTATION REQUIRED | ← 625 |
| | HICKEY | ← 626 |
| | STREAK | ← 627 |
| | | |
| | | |

FIG.11B

| INSPECTION INSTRUCTION SHEET | | ← 630 |
|---|---|---|
| \*NRT20190123-005\* (barcode) | | ← 621 |
| JOB ID | NRT20190123-005 | ← 622 |
| PRINTER | Printer-01 | ← 623 |
| BARCODE | IMPLEMENTATION REQUIRED | ← 624 |
| IMAGE DEFECT | IMPLEMENTATION REQUIRED | ← 625 |
| | HICKEY | ← 626 |
| | STREAK | ← 627 |
| TINT | INLINE IMPLEMENTATION | ← 628 |
| POSITIONAL SHIFT | IMPLEMENTATION NOT REQUIRED | ← 629 |

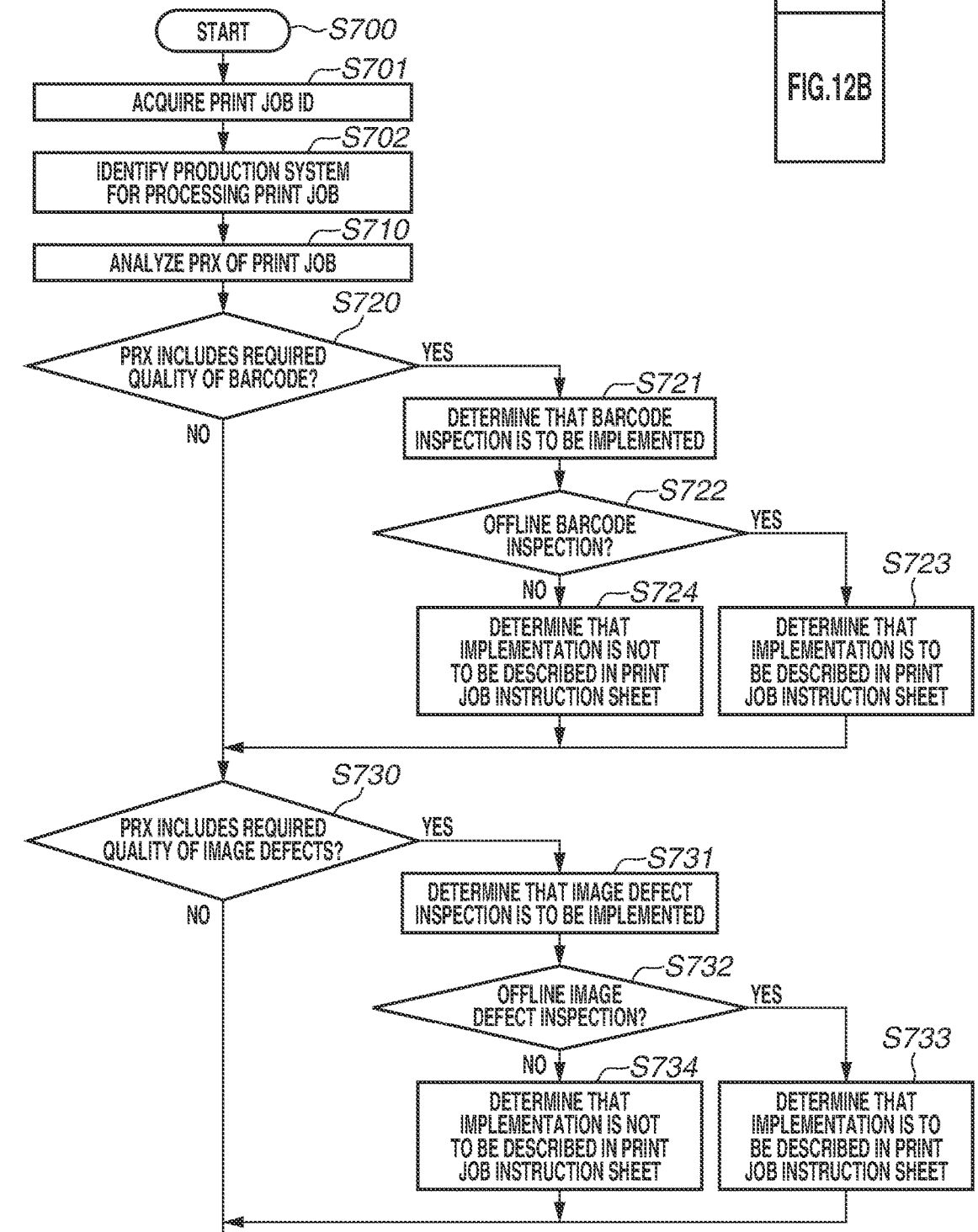

JOB PROCESSING SYSTEM, METHOD FOR CONTROLLING THE SAME, AND STORAGE MEDIUM

BACKGROUND

Field of the Disclosure

The present disclosure relates to a job processing system, a method for controlling the job processing system, and a storage medium.

Description of the Related Art

There are forms of print service called print on demand (POD), production printing, and commercial printing. In these forms of service, there are customers (also referred to as end users) who order and request printing and printing companies that offers printed matters. A customer orders a print product by providing the specifications of a target printed matter and, if necessary, image data to be used in printing to a printing company. Examples of the specifications of a printed matter include the paper type to be used, finishing settings such as bookbinding and stapling, the number of print sheets, and the number of copies. The printing company produces the target printed matter based on the requested content and the image data and then delivers the printed matter to the customer.

In such a commercial print service, the printing company uses diverse types of apparatuses and software to deal with the processing from order receiving to delivery of printed matters. For example, the printing company uses a web server for accepting orders of printed matters from the customers in addition to a printing apparatus for performing printing on paper, a finisher for performing bookbinding and stapling, and an inspection apparatus for inspecting print products. The printing company also uses terminals and software for managing the production of printed matters. In addition, a plurality of users uses these apparatuses and software. Examples of such users include a person in charge of order reception, management of order items, and communication with customers, a process designer who designs operation processes for completing printed matters, an operator who operates a printing apparatus and an inspection apparatus, and a quality checker who checks the quality of final printed matters. Some printing companies have a plurality of production sites. Such a printing company determines a production site where each printed matter is to be produced based on the order content.

In the commercial print service, a customer often specifies quality conditions for a printed matter to a printing company. The quality conditions are different from the specifications of the printed matter, and refer to the quality of the printed matter, such as an amount of an image positional shift between the front and back sides of paper, and color value variations between a plurality of copies or between a plurality of pages. Examples of printed matters include distribution items (such as flyers and brochures), photo albums, books, business cards, and exhibition panels. Since printed matters are used for diverse applications at various prices, diverse quality conditions and levels are requested. As discussed below, the printing company requires operation processes for satisfying the quality conditions and operation processes for checking the quality of a printed matter. For this reason, it is common that the cost of a printed matter increases with an increase in the level of the quality conditions. The printing company produces the printed matter while performing various adjustment operations so that the quality conditions are satisfied. For example, based on a sample printing result that has been acknowledged by the customer, the printing company performs various adjustments for color matching of a specific color on specific paper on the printing apparatus and performs post-print inspections to remove printed matters that do not satisfy the quality conditions as defective products. The printing company checks whether the quality of the printed matter achieved by these operations satisfies the quality conditions requested by the customer.

In particular, when orders of printed matters with diverse specifications and quality conditions are accepted from many customers, the required number of types of operations for satisfying the quality conditions of the customers increases, and the required time period increases for each printed matter. For example, as the quality conditions, a print shift between the front and the back sides is requested for a printed matter A, and the consistency with a color sample presented by the customer is requested for a printed matter B. In this case, the person in charge of order reception needs to transmit the quality conditions of each of the printed matters to the process designer by using a data format used in the printing company. In the production of each printed matter, the process designer determines operation processes for satisfying the quality conditions based on the types and states of the printing apparatus and software usable by the printing company. For example, the process designer determines processes to be performed, such as a device adjustment of a post-processing apparatus for the printed matter A and a color calibration of the printing apparatus for the printed matter B. The process designer further determines a process such as a result check operation for the processes including a colorimetry operation after the color calibration. The process designer also determines an inspection method, i.e., how to check whether the produced printed matter satisfies the quality conditions, such as check points for a print shift between the front and the back sides of paper and the maximum value of the permissible shift amount. It is common that a plurality of printing apparatuses is used in the printing company. The process designer needs to select the apparatus most suitable for satisfying the quality conditions of the ordered printed matter from among the plurality of printing apparatuses. In this way, the printing company needs to define a workflow for producing a printed matter that satisfies the quality conditions and checking the quality of the produced printed matter. The operator receives the operation processes determined in this way, and performs operations of the printing apparatus and software. The quality checker confirms that the printed matter satisfies the quality conditions based on the produced printed matter and the inspection method. In this way, the printing company uses a large number of operation processes for the quality conditions and operation processes for satisfying the quality conditions.

When the customer and the printing company exchange the quality conditions, no unified information format has conventionally been defined or used. Thus, the printing company receives the quality conditions in different information formats from a plurality of customers, resulting in inconveniences in designing operation processes for satisfying the quality conditions. When the customer orders printed matters to a plurality of printing companies, it has been troublesome for the customer to deliver the quality conditions in different information formats.

Accordingly, as a method for unifying information formats for transmitting the quality conditions, Print Requirement eXchange (PRX) is considered as a standardization technique. PRX refers to the standard data format of the required print quality conditions. The use of PRX makes it possible to describe the quality conditions for different customers or different orders in a unified standard data format. Using PRX in this way enables transmission of the quality conditions that have not conventionally been unified in a unified information format.

By using PRX describing the quality conditions requested by the customer, the printing company can design operation processes for satisfying the quality conditions performed when producing a printed matter and operation processes for checking the quality of the printed matter, by using a printing system without the operator's intervention. In addition, presetting of the printing apparatus and software can be automatically performed.

As described above, the quality checker inspects the quality of the printed matter to make sure that the produced printed matter satisfies the quality conditions and then records an inspection result. For example, the quality checker measures the amount of an image positional shift between the front and back sides of paper, and the color value variations between a plurality of copies or between a plurality of pages, and records these values. The quality checker also inspects the print quality of a barcode and a QR Code® printed in the printed matter by using an inspection apparatus, and records a grade of quality. The quality checker also visually inspects the printed matter to make sure that the printed matter has no image defects such as so-called white spots and hickeys, and records the inspection result.

As a method for unifying the information format for transmitting the inspection result, Print Quality eXchange (PQX) has been considered as a standardization technique. PQX refers to the standard data format for the results of inspecting the quality of printed matters. The use of PQX makes it possible to describe the results of inspecting the quality of printed matters in a unified standard data format. Using PQX in this way enables transmission of the results of inspecting the quality of printed matters that have not conventionally been unified in a unified information format.

PRX and PQX make it possible to digitally issue an instruction for quality requirements such as the amount of a positional shift and the range of color value variations. Depending on the content of PRX, inspection operations by the operator may be necessary for some inspections such as a barcode inspection.

However, it is not easy for the operator to determine, by viewing PRX data, that some inspection items need to be manually implemented by the operator and to identify such inspection items.

For example, when it is necessary to perform a so-called visual inspection for visually observing that a printed matter has no image defects such as so-called white spots and hickeys, the operator needs to notify the quality checker in charge of visual inspections of necessity of a visual inspection. To inspect the print quality of a barcode or a QR code, the operator moves a print product printed by the printing apparatus to a so-called barcode inspection apparatus that is unconnected with the printing apparatus on the paper conveyance path, and then performs the barcode inspection by using the barcode inspection apparatus. To accomplish this, the operator needs to notify the quality checker in charge of barcode inspections with use of the barcode inspection apparatus of necessity of a barcode inspection.

Japanese Patent Application Laid-Open No. 2014-235678 discusses a technique for analyzing print instruction information to determine whether trial printing as a print attribute is required. However, while the print instruction information indicates a print attribute, e.g., one-sided or double-sided printing or implementation of stapling, it does not include the required quality conditions of a print job described in PRX. Thus, required inspections cannot be identified based on the required quality conditions.

SUMMARY

According to embodiments of the present disclosure, a job processing system that causes a job processing apparatus to execute a job includes a reception unit configured to receive required quality data, and a notification unit configured to, based on the required quality data received by the reception unit, notify a user that an output product output by executing the job needs to be inspected by an inspection apparatus.

Further features of the present disclosure will become apparent from the following description of exemplary embodiments with reference to the attached drawings.

BRIEF DESCRIPTION OF THE DRAWINGS

FIG. 3 illustrates a software configuration according to the exemplary embodiment.

FIG. 4 illustrates required quality parameters for a Print Requirement eXchange (PRX) analysis result according to the exemplary embodiment.

FIG. 5 illustrates required quality parameters for a PRX analysis result according to the exemplary embodiment.

FIG. 6 illustrates required quality parameters for a PRX analysis result according to the exemplary embodiment.

FIG. 7 illustrates required quality parameters for a PRX analysis result according to the exemplary embodiment.

FIG. 8 illustrates required quality parameters for a PRX analysis result according to the exemplary embodiment.

FIGS. 9A and 9B illustrate required quality parameters for Print Quality eXchange (PQX) analysis results according to the exemplary embodiment.

FIG. 10 illustrates a screen displayed on a workflow management terminal according to the exemplary embodiment.

FIGS. 11A and 11B illustrate inspection instruction sheets according to the exemplary embodiment.

FIG. 12, which includes FIGS. 12A and 12B, illustrates a flowchart according to the exemplary embodiment.

DESCRIPTION OF THE EMBODIMENTS

Exemplary embodiments of the present disclosure will be described in detail below with reference to the accompanying drawings. The following exemplary embodiments do not limit the present disclosure. Not all the combinations of the features described in the present exemplary embodiment are necessarily indispensable to the solving means of the present disclosure. In particular, descriptions will be provided on the premise that Print Requirement eXchange (PRX) is a file format of a file prescribing a print quality requirement criterion for a print job, and Print Quality eXchange (PQX) is a file format prescribing a level of print quality of a printed matter. PRX refers to a standard data format of required print quality conditions. The use of PRX makes it possible to describe the quality conditions for different customers or different orders in a unified standard data format. Using PRX in this way enables transmitting the quality conditions that have not conventionally been unified in a unified information format. PQX refers to a standard data format of a result of inspecting the quality of a printed matter. The use of PQX makes it possible to describe the result of inspecting the quality of a printed matter in a unified standard data format. Using PQX in this way enables transmitting the result of inspecting the quality of a printed matter that has not conventionally been unified in a unified information format. However, the present disclosure is not limited to PRX and PQX but is applicable to an arbitrary format that prescribes the quality conditions of a print job.

Figure 1:
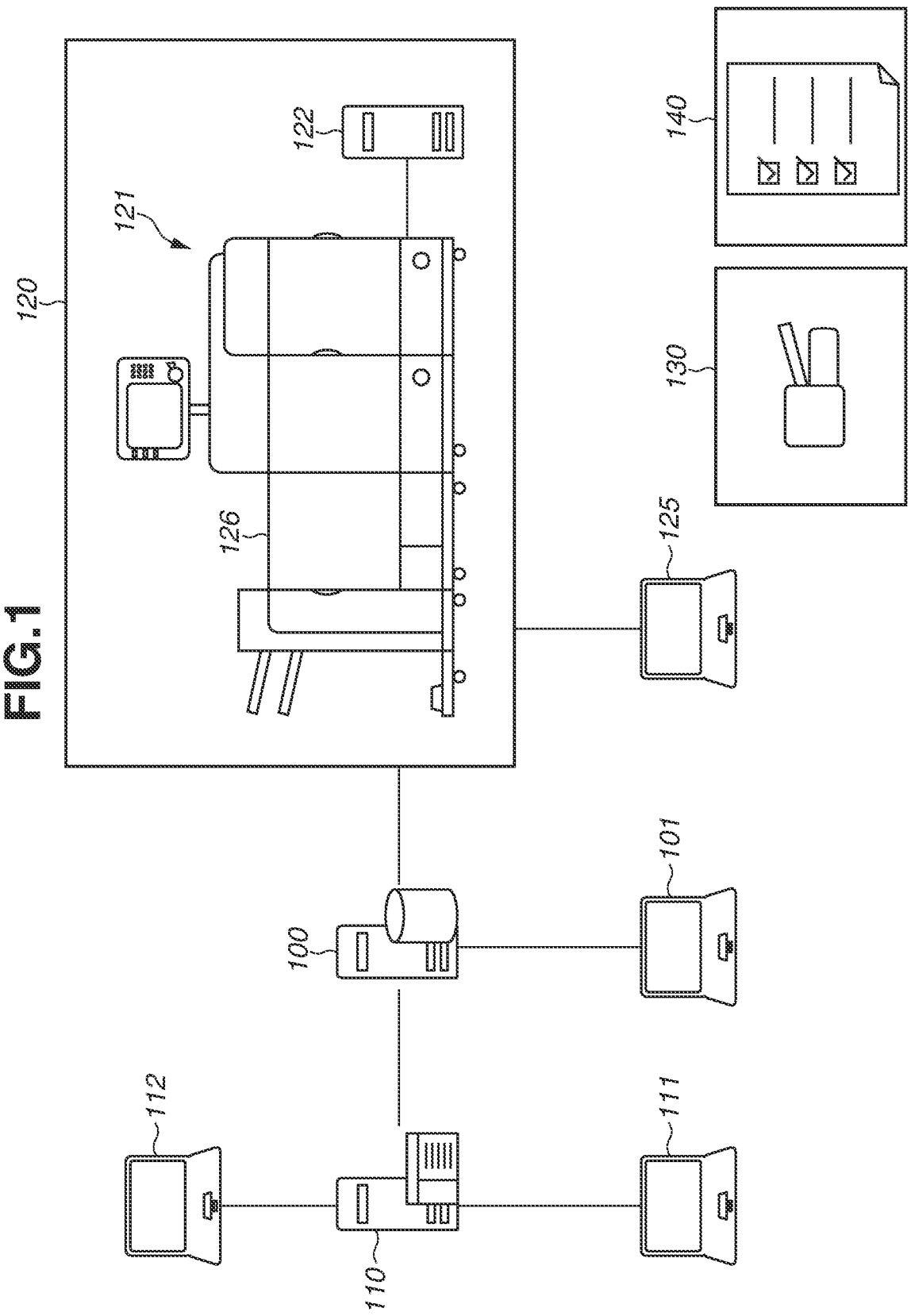
FIG. 1 illustrates a system configuration according to an exemplary embodiment.

FIG. 1 illustrates a configuration of a commercial printing system as an example of a job processing system according to the present exemplary embodiment.

A workflow management server 100 is an apparatus that manages an entire workflow related to print job processing.

A workflow management terminal 101, a terminal operated by a workflow administrator, connects with the workflow management server 100 via a network to perform various functions and receive and display information from the workflow management server 100. More specifically, various functions include a function of changing the settings of a workflow management function, a function of checking the device status of a production system 120, and a function of displaying information about a contradiction between print data and PRX. While only one production system 120 is illustrated in FIG. 1, the workflow management server 100 may manage a plurality of the production systems 120. In this case, in consideration of the capability of each production system 120 such as color printing capability and printing speed as well as the excessive concentration state of job processing, the workflow management server 100 selects a production system 120 suitable for the content of a print job, and then causes the production system 120 to process the print job.

An order reception system server 110 is an apparatus that manages a system for receiving an order of a printed matter of commercial printing from an end user.

An order reception system management terminal 111, a terminal operated by an order reception system administrator, connects with the order reception system server 110 via a network to perform each function of the order reception system server 110.

An end user terminal 112 is operated by the end user to order a job to the order reception system server 110.

The production system 120 produces printed matters in commercial printing. More specifically, the production system 120 includes a printing apparatus 121 and a print server 122 that controls the printing apparatus 121. The printing apparatus 121 incorporates an inline inspection apparatus 126. The inline inspection apparatus 126 is a kind of an accessory unit connected with the printing apparatus 121 in an inline mode. The inline inspection apparatus 126 has a function of scanning a printed image with a sensor in the unit, a function of measuring a distance of a horizontal or vertical positional shift of an image on a printed product with respect to a sheet and a distance of a positional shift between the front and the back sides of the sheet, and a function of measuring a tint of an image part. Since the inline inspection apparatus 126 is connected with the printing apparatus 121 in the inline mode, the above-described functions enable performing inspections of a positional shift and tint (described below) during printing.

The print server 122 performs print processing based on data and an instruction from the workflow management server 100, and issues a print instruction to the printing apparatus 121.

The printing apparatus 121 performs printing based on data and an instruction from the print server 122. The printing method is not limited to a specific method and may be the electrophotographic method, the ink-jet method, or any other method. When a sheet is printed by the printing apparatus 121, processing is performed as follows: the sheet with an image formed thereon is conveyed to the inline inspection apparatus 126 and subjected to image inspection, and then the sheet is conveyed to an apparatus called an accessory and subjected to processing such as stapling or punching.

A production operator terminal 125, a terminal operated by an operator who operates various devices of the production system 120, connects with the production system 120 via a network. The production operator terminal 125 has a function of checking device operating statuses and a function of checking error information if an error occurs. As another exemplary embodiment, these functions may be performed not by an external terminal but by a User Interface (UI) such as an operation unit of each device.

An offline inspection apparatus 130 inspects a printed matter printed by the production system 120. The inline inspection apparatus 126 is incorporated in the printing apparatus 121 while the offline inspection apparatus 130 is unconnected with the printing apparatus 121 via a paper conveyance path. Thus, a printed matter printed by the printing apparatus 121 needs to be conveyed to the offline inspection apparatus 130. The inline inspection apparatus 126 and the offline inspection apparatus 130 are distinguished depending on whether each apparatus is connected with the printing apparatus 121 via the paper conveyance path, regardless of whether each apparatus is connected with the commercial printing system via a network. While the offline inspection apparatus 130 is illustrated to be unconnected via a network in FIG. 1, the apparatus may be connected via a network. Descriptions will be provided so that the functions can be implemented in either case.

After performing a visual inspection of a printed matter produced by the production system 120, a quality checker inputs a result of the visual inspection in a visual inspection result entry sheet 140. For example, the quality checker fills in the visual inspection result entry sheet 140 made of paper with a pen, and then scans the sheet with a scanner. Then, an input result is accumulated in the workflow management server 100 via a network. Further, the result of the visual inspection can be input on a tablet terminal, and an input result is accumulated in the workflow management server 100 via a network. Although, the visual inspection result entry sheet 140 is illustrated to be unconnected via a network in FIG. 1, the sheet may be connected via a network. Descriptions will be provided so that the functions can be implemented in either case.

A processing flow from when the commercial printing system receives an order of a print job to when the commercial printing system performs printing will be described below.

Firstly, the end user connects with the order reception system server 110 from the end user terminal 112 via a network. Then, the end user orders a print job by issuing instructions for selecting a printed matter, transmitting document data, and placing an order to the order reception system server 110 from a UI such as a web browser. Since one or more end users order one or more print jobs, the order reception system server 110 stores order reception data for one or more print jobs.

Then, the order reception system administrator connects with the order reception system server 110 that stores the order reception data for one or more print jobs from the order reception system management terminal 111, and performs each function of the order reception system server 110 from a UI such as a web browser. More specifically, the functions of the order reception system server 110 include a function of setting a required quality for each printed matter, a function of checking the status of each ordered job, and a function of browsing quality information about a printed matter for each ordered job.

Then, the workflow administrator connects with the workflow management server 100 from the workflow management terminal 101, and performs each function of the workflow management server 100 from a UI such as a web browser. More specifically, the workflow administrator connects with the order reception system server 110, selects a print job to be executed on the day from among a plurality of stored print jobs, acquires the order reception data, and stores the data in the workflow management server 100. The workflow management server 100 receives the print data and PRX, which is quality condition information, from the order reception system server 110. Then, the workflow management server 100 interprets PRX received from the order reception system server 110, determines the production system 120 for each ordered job, and subjects the print data to prepress processing. In the present exemplary embodiment, the prepress processing refers to processing applied to the print data before the printing apparatus 121 performs printing. The prepress processing includes inspecting fonts and characteristics used in the print data to prepare for performing printing without any problem. The workflow management server 100 analyzes the acquired order reception data, determines whether printing conditions are satisfied, and instructs the production system 120 to print the order reception data that is determined as being printable. Further, when the workflow management server 100 instructs the production system 120 to perform printing, the print server 122 receives the print data. Then, the print server 122 subjects the print data generally referred to as Raster Image Processing (RIP) data to data processing so that the data can be printed on a printer, and transmits the processed data to the printing apparatus 121. The printing apparatus 121 receives the data and performs printing.

The workflow management server 100 interprets PRX and issues an inspection instruction for checking the print quality of the printed matter that has been printed. For example, the workflow management server 100 instructs the inline inspection apparatus 126 to perform the above-described inspections, such as measurement of the amount of an image positional shift between the front and back sides of a sheet and measurement of the image tint between a plurality of copies or between a plurality of pages. The inspections performed by the inline inspection apparatus 126 are performed at the same time as when printing is performed by the production system 120. The workflow management server 100 issues an instruction about contents of the inspection to be performed by the inline inspection apparatus 126, to the production system 120 via a network.

In offline inspections, on the other hand, it is necessary to operate the offline inspection apparatus 130, issue an inspection instruction to the quality checker in charge of the implementation of the inspection, and allows the quality checker to implement the inspection in response to the received instruction. For example, when performing a barcode inspection as described above, the quality checker sets a printed matter on a barcode inspection apparatus as the offline inspection apparatus 130 and then starts the inspection. For this reason, in the offline inspections, the quality checker needs to appropriately know the inspection to be performed. Thus, in many cases, the printing system proceeds with required inspection processes by using a work instruction sheet. Thus, an inspection instruction sheet is used.

Then, the workflow management server 100 totals one or more accumulated inspection results on a job basis, and describes the print quality of the printed matter in a PQX format. Further, the workflow management server 100 compares PRX describing the required quality for the printed matter specified by the customer with PQX to determine whether the required quality is satisfied. When the workflow management server 100 confirms that the required quality is satisfied, the workflow management server 100 transmits the generated PQX to the order reception system server 110.

The order reception system server 110 reports that the print quality of the printed matter satisfies the required quality for the printed matter specified by the customer, accumulates PRX and PQX so that PRX and PQX can be offered as required, and then transmits the printed matter to a location specified by the customer, thus completing the print order.

This completes the description of the processing flow from when the commercial printing system receives an order of a print job to when it performs printing.

While, in the present exemplary embodiment, the workflow management server 100 is an on-premise server installed in the location of workflow management, the present disclosure is not limited thereto. As another exemplary embodiment, the workflow management server 100 may be configured as a cloud server to which the workflow management terminal 101 (described below) connects via the Internet. This also applies to the order reception system server 110 (described below).

While, in the present exemplary embodiment, the workflow management server 100 interprets PRX and subjects the print data to the prepress processing, the present disclosure is not limited thereto. As another exemplary embodiment, the order reception system server 110 (described below) may perform these pieces of processing, or the print server 122 of the production system 120 (described below) may perform these pieces of processing. Alternatively, the PRX interpretation and the prepress processing on the print data may be performed by different servers. For example, the order reception system server 110 may interpret PRX, and the workflow management server 100 may perform the prepress processing.

Next, the hardware configuration of various apparatuses according to the present exemplary embodiment will be described below.

Figure 2:
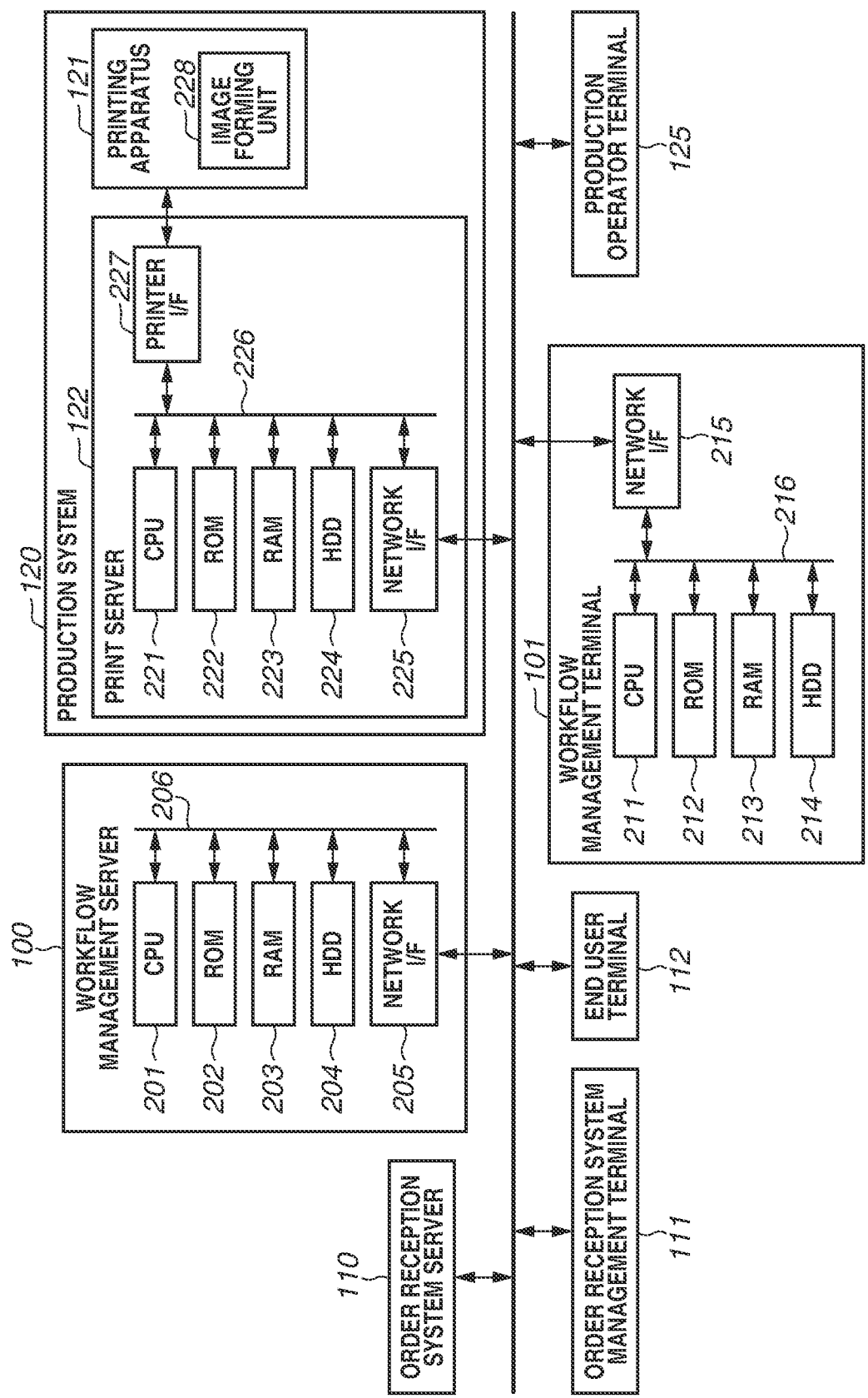
FIG. 2 illustrates a hardware configuration according to the exemplary embodiment.

FIG. 2 is a block diagram illustrating a hardware configuration of the commercial printing system including the workflow management server 100, the workflow management terminal 101, and the print server 122 according to the present exemplary embodiment.

Firstly, a hardware configuration of the workflow management server 100 will be described below.

A central processing unit (CPU) 201 loads a control program stored in a read only memory (ROM) 202 or a hard disk (HDD) 204 into a random access memory (RAM) 203 and then executes the loaded program to totally control access to various devices connected to a system bus 206. The ROM 202 stores control programs that can be executed by the CPU 201. The RAM 203 mainly functions as the main memory and a work area of the CPU 201, and is configured to expand the memory capacity by using an optional RAM 203 to be connected to an expansion port (not illustrated). The HDD 204 stores control programs that can be executed by the CPU 201, the boot program, various applications, font data, user files, and edit files. While the HDD 204 is used in the first present exemplary embodiment, a secure digital (SD) card or a flash memory may be used as an external storage device, in addition to the HDD 204. This also applies to an apparatus having an HDD (described below). A network interface (I/F) 205 performs data communication with various apparatuses via a network.

The hardware configuration of the order reception system server 110 is also similar to the hardware configuration of the workflow management server 100, and redundant descriptions thereof will be omitted.

The hardware configuration of the workflow management terminal 101 will be described below.

A CPU 211 loads a control program stored in a ROM 212 or an HDD 214 into a RAM 213 and then executes the loaded program to totally control access to various devices connected to a system bus 216. The ROM 212 stores control programs that can be executed by the CPU 211. The RAM 213 mainly functions as the main memory and a work area of the CPU 211, and is configured to expand the memory capacity by using an optional RAM 213 to be connected to an expansion port (not illustrated). The HDD 214 stores the boot program, various applications, font data, user files, and edit files. A network I/F 215 performs data communication with other apparatuses via a network.

The hardware configurations of the order reception system management terminal 111, the end user terminal 112, and other terminals such as the production operator terminal 125 are similar to the hardware configuration of the workflow management terminal 101, and redundant descriptions thereof will be omitted.

A hardware configuration of the print server 122 will be described below.

A CPU 221 loads a control program stored in a ROM 222 or an HDD 224 into a RAM 223 and then executes the loaded program to totally control access to various devices connected to a system bus 226. The ROM 222 mainly stores control programs that can be executed by the CPU 221. The RAM 223 mainly functions as the main memory and a work area of the CPU 221, and is configured to expand the memory capacity by using an optional RAM 223 to be connected to an expansion port (not illustrated). The HDD 224 stores executable control programs, the boot program, and various applications. The HDD 224 also stores font data, user files, and edit files. A network I/F 225 performs data communication with other apparatuses via a network. A printer I/F 227 controls image output to an image forming unit 228 of the printing apparatus 121.

The hardware configuration of the printing apparatus 121 will be described below.

The image forming unit 228 outputs the print data to a sheet. The image forming unit 228 has a hardware configuration similar to a configuration of a general printing apparatus. The printing apparatus 121 also includes a hardware component other than the image forming unit 228. However, the hardware component is not directly related to the present disclosure and is not different from that in a general printing apparatus. Thus, redundant descriptions thereof will be omitted.

A software configuration of the workflow management server 100 according to the present exemplary embodiment will be described below with reference to FIG. 3.

Software modules are implemented by the CPU 201 reading a program stored in the ROM 202 or the HDD 204, loading the program into the RAM 203, and then executing the program. A data management unit 301 receives the print data and PRX from the order reception system server 110 and manages the print data and PRX. An integrated control unit 302 reads PRX and the print data from the data management unit 301, analyzes PRX and the print data, analyzes whether there is inconsistency between PRX and the print data based on the flowchart (described below), and records the result in a log file. The data management unit 301 manages the log file. A PRX interpretation unit 303 analyzes PRX received from the order reception system server 110 to identify print quality conditions. A prepress processing unit 304 analyzes the print data received from the order reception system server 110.

While, in the present exemplary embodiment, the workflow management server 100 includes the PRX interpretation unit 303 and the prepress processing unit 304 that subjects the print data to the prepress processing, the present disclosure is not limited thereto. As another exemplary embodiment, the order reception system server 110 or the print server 122 of the production system 120 may include the PRX interpretation unit 303 and the prepress processing unit 304.

FIGS. 4 to 8 illustrate specific examples of PRX descriptions.

FIG. 4 illustrates an overall configuration of PRX. In a tag PRX 411, there are a tag QualitySpecification 412, a tag CustomerJob 413, and a tag QualityGoals 414. The following four different tags are described under the tag QualityGoals 414, and the required print quality is described in the four different viewpoints. The four different tags are a tag Color 415, a tag Registration 416, a tag Defects 417, and a tag Barcode 418, which will be described in detail below.

FIG. 5 illustrates a configuration of the tag Color 415. The tag Color 415 defines the print quality requirement criterion related to a tint difference. As a result of measuring the tint of a part in an image of a print product with a colorimeter and calculating the difference between the measured tint and a reference tint, this print quality requirement criterion requires that the calculated difference falls within the required quality criterion. As the difference, dE ($\Delta$E) is generally used. In the tag Color 415, a tag ComplianceGoal 421 defines the target color standard. In this example, "G7" is described. A tag MinimumAcceptableRank 424 and a tag DesiredRank 425 are described under the configuration of a tag ColorScore 422 and a tag ScoringInfo 423. These tags respectively define a rank to be minimally observed and a rank to be desirably observed. In this example, ranks 3 and 4 are described, respectively. The values of these Ranks are defined by using the following tags. A tag UoM 427 and a tag ParameterScore 428 are described under a tag ColorScoringScale 426. A tag LogicalOperator 429 and a tag CalculatedValue 42a are described under the tag ParameterScore 428. These tags define the rank of the tag Color 415. In this example, the tag ColorScoringScale 426 defines rank "4". The tag UoM 427 describes a unit dE (4E), the tag ParameterScore 428 describes "less than or equal to" (LTE), and the tag CalculatedValue 42a describes a value "5". These tags define that the rank "4" corresponds to dE of 5 or less. Similarly, a tag ParameterScore 42b define that rank "3" corresponds to dE of 10 or less.

As described above, based on the color standard of "G7", PRX for defining the tag Color 415 defines the required print quality that indicates that at least the rank "3", i.e., dE of 10 or less, desirably the rank "4", i.e., dE of 5 or less is to be satisfied.

FIG. 6 illustrates a configuration of the tag Registration 416. The tag Registration 416 defines the print quality requirement criterion related to a print positional shift on a sheet. As a result of measuring the length of a horizontal or vertical positional shift of an image on a print product with respect to a sheet and the length of a positional shift between the front and the back sides of the sheet, the print quality requirement criterion requires that the difference falls within the required quality criterion. In the tag Registration 416, a tag MinimumAcceptableRank 433 and a tag DesiredRank 434 are described under a tag RegistrationScore 431 and a tag ScoringInfo 432. These tags respectively define a rank to be minimally observed and a rank to be desirably observed. In this example, ranks 7 and 8 are described, respectively. The values of these Ranks are defined by using the following tags. A tag UoM 436 and a tag ParameterScore 437 are described under a tag RegistrationScoringScale 435. Further, the following tags are configured under a tag ValueRange 438. The tag ParameterScore 437 defines the rank 8 called Excellent. This definition includes a tag LogicalOperator 43*a*, a tag CalculatedValue 43*b*, a tag LogicalConnector 43*c*, a tag LogicalOperator 43*d*, and a tag CalculatedValue 43*e*. In the tag UoM 436, um indicates 1 micrometer, i.e., ¹⁄₁,₀₀₀ millimeters. For example, the tags 43*a* to 43*e* respectively indicate "less than" (LT), 2, AND, "greater than or equal to" (GTE), and 1. This example indicates that the rank 8 is defined as the length that is greater than or equal to 1 micrometer and less than 2 micrometers. A tag ParameterScore 43*f* defines the rank 7 called Good, and similarly, the rank 7 is defined as the length that is greater than or equal to 2 micrometers and less than or equal to 4 micrometers.

FIG. 7 illustrates a configuration of the tag Defects 417. The tag Defects 417 defines the print quality requirement criterion related to image defects in a print product. The print quality requirement criterion requires that no image defect exists in an image of a print product, or if an image defect exists, as a result of measuring the size of the image defect, the print quality requirement criterion requires that the size of the image defect falls within the required quality criterion. In the tag Defects 417, a tag MinimumAcceptableRank 442 and a tag DesiredRank 443 are described under a tag ScoringInfo 441. These tags respectively define a rank to be minimally observed and a rank to be desirably observed. In this example, ranks 7 and 8 are described, respectively. The values of these Ranks are defined by using a tag UoM 44*a* and subsequent tags. In a tag DefectTypeDefinition 444, a tag DefectName 445 describes a hickey and a tag Definition 446 describes its definition. In this example, the hickey is defined as a print image defect due to a debris. Similarly, a tag DefectName 447 describes a line or streak that is defined as a print image defect appearing as a thin horizontal line. Further, the tag UoM 44*a* and a tag ParameterScore 44*b* are described under a tag DefectParameter 448 and a tag DefectParameterScale 449. Further, the following tags are configured under a tag ValueRange 44*c*. The tag ParameterScore 44*b* defines the rank 8 called Excellent. This definition includes a tag LogicalOperator 44*d*, a tag CalculatedValue 44*e*, a tag LogicalConnector 44*f*, a tag LogicalOperator 44*g*, and a tag CalculatedValue 44*h*. In the tag UoM 44*a*, um indicates 1 micrometer, i.e., ¹⁄₁,₀₀₀ millimeters. For example, the tags 44*d* to 44*h* respectively indicate LT, 3, AND, GTE, and 1. This example indicates that the rank 8 is defined as the size that is greater than or equal to 1 micrometer and less than 3 micrometers. A tag ParameterScore 44*i* defines the rank 7 called Good, and similarly, the rank 7 is defined as the size that is greater than or equal to 3 micrometers and less than or equal to 4 micrometers.

FIG. 8 illustrates a configuration of the tag Barcode 418. The tag Barcode 418 defines the print quality requirement criterion related to the print quality of one-dimensional barcodes and two-dimensional barcodes (hereinafter referred to as barcodes). As a result of measuring the print quality of a barcode, e.g., the contrast and luminance of the barcode, printed in an image of a print product, the print quality requirement criterion requires that the print quality of the barcode satisfies the required quality criterion. In the tag Barcode 418, a tag ComplianceGoal 451 defines the target barcode standard. In this example, the tag ComplianceGoal 451 indicates that the print quality conforms to the international standard of one-dimensional barcodes called International Organization Of Standardization (ISO) 15426-1. A tag MinimumAcceptableRank 454 and a tag DesiredRank 455 are described under a tag BarcodeScore 452 and a tag ScoringInfo 453. These tags respectively define a rank to be minimally observed and a rank to be desirably observed. In this example, ranks 1 and 1 are described, respectively. A tag Score 457 under a tag BarcodeScoringScale 456 defines that Pass is displayed if the rank is 1. A tag BarcodeSymbology 459 under a tag BarcodeParameter 458 indicates the type of the barcode. In this case, the tag BarcodeSymbology 459 describes a barcode of type Code128.

FIGS. 9A and 9B illustrate specific examples of PQX.

FIG. 9A illustrates an overall configuration of PQX. The following four tags are described under a tag SampleCollection 512 and a tag Sample 513. The four tags store inspection results with respect to the print quality requirement criterion from the four different viewpoints described above with reference to FIG. 4. A tag ColorReport 514 stores an inspection result with respect to the print quality requirement criterion regarding the tint difference illustrated in FIG. 5. A tag RegistrationReport 515 stores an inspection result with respect to the print quality requirement criterion regarding the print positional shift illustrated in FIG. 6. A tag DefectReport 516 stores an inspection result with respect to the print quality requirement criterion regarding the print defect illustrated in FIG. 7. A tag BarcodeReport 517 stores an inspection result with respect to the print quality requirement criterion regarding the print quality of a barcode illustrated in FIG. 8.

FIG. 9B illustrates the overall configuration of the tag BarcodeReport 517.

A tag Barcode1DEntry 552 under a tag VerificationSet 551 indicates that it is a one-dimensional barcode. In a tag ISO1DVerification 554 under the tag Barcode1DEntry 552, a tag OverallSymbolGrade 555, a tag MinimumReflectance 556, a tag SymbolContrast 557, a tag MinimumEdgeContrast 558, a tag Modulation 559, a tag BarcodeDefects 55*a*, a tag Decodability 55*b*, and a tag Decode 55*c* are described. These tags are configured to store inspection items conforming to the international standard of one-dimensional barcodes called ISO 15426-1.

Figure 13:
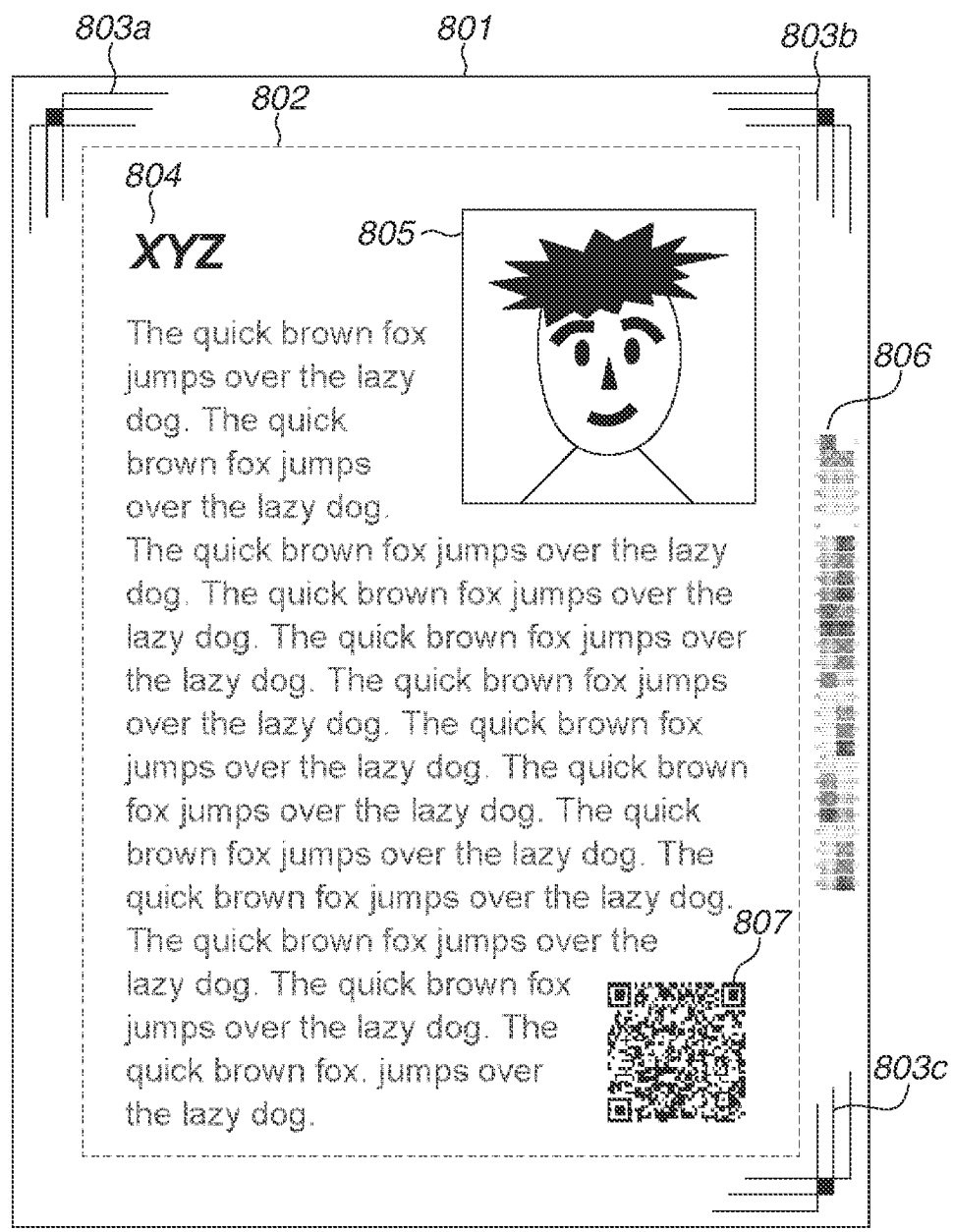
FIG. 13 illustrates an example of an image on one page of a job subjected to an inspection according to the exemplary embodiment.

FIG. 13 illustrates an example of an image on one page of a job subjected to an inspection.

A sheet 801 is a sheet for one page. The sheet 801 has parts (described below) printed thereon. Registration marks 803*a* to 803*c* are examples of marks for checking a print positional shift between the front and the back sides of the sheet. A print positional shift between the front and the back sides is checked by aligning the registration marks on both sides. While the registration marks are printed at three corners of the sheet 801 in this example, positions and the number of marks may depend on the types of the marks. A part 804 is an example of a part subjected to the tint inspection. The color is strictly defined, for example, for a company logo, and is defined as PANTONE No. XX or DIC No. YY. The tint inspection checks whether a color of a target part coincides with the defined color. To check whether the tint of the output of the production system 120 conforms to a standard such as JapanColor (print color standard), a chart thereof may be actually printed. A chart 806 is an example of the chart. A part 805 is an example of a part subjected to the image defect inspection. In many cases, it is required that there is no image defect in a photographic image, in particular, in the face and skin of a person. A part 807 is an example of a part subjected to the barcode inspection. While a QR code is used in this example, the barcode may be of another type as there are various types of barcodes.

The image is subjected to some or all of the barcode, the image defect, the tint, and the positional shift inspections. The outside of an area 802 is clipped before delivering of the job. Register marks for clipping are not related to the inspections and therefore are not displayed.

FIG. 10 illustrates an example of an inspection list screen generated by the workflow management server 100.

The inspection list screen displays a plurality of print jobs to be processed by the workflow management server 100 in list form so that the operator can understand at a glance which inspection is required for each print job. A first row 611 indicates a job identifier (ID) as job identification information. A second row 612 indicates apparatus information indicating the printer for processing the job, i.e., the name of the production system 120. The rows below the row 612 indicate necessity of each individual inspection for the relevant job. A third row 613 indicates the necessity of the barcode inspection. A fourth row 614 indicates the necessity of the image defect inspection. A fifth row 615 indicates the necessity of the tint inspection. A sixth row 616 indicates the necessity of the positional shift inspection. In the rows 613 to 616, "Implementation Required" is displayed if each inspection needs to be implemented in offline mode, "Inline Implementation" is displayed if each inspection needs to be implemented in inline mode, and "Implementation Not Required" is displayed if each inspection is not required. Since results of determinations specifically described in the flowchart illustrated in FIGS. 12A and 12B (described below) are stored in the data management unit 301, the values indicated in the rows 611 to 616 are read and displayed by the integrated control unit 302.

With regard to the row (image defect) 614, if defect types, e.g., a hickey and a streak, are stored in the data management unit 301 as a result of the determinations specifically described in the flowchart illustrated in FIGS. 12A and 12B (described below), the defect types may be read and displayed by the integrated control unit 302. Whether the defect types are to be displayed may be determined depending on the way of operation by the operator. For example, if the workflow management terminal 101 is provided with a large display screen, and the quality checker monitors the screen illustrated in FIG. 10 displayed on the large screen on the inspection site to confirm the required inspections, the screen may also display the defect types. Alternatively, if the quality checker has a personal digital assistance represented by a tablet terminal and performs inspections while monitoring the screen illustrated in FIG. 10, the screen may also display the defect types. Further, if the quality checker performs inspections while checking the inspection instruction sheet illustrated in FIG. 11A, the quality checker does not check the screen illustrated in FIG. 10. Thus, the screen does not display the defect types.

FIG. 11A illustrates an example of an inspection instruction sheet generated by the workflow management server 100.

In an inspection instruction sheet 620, a job ID is displayed in a second row 622 and a barcode indicating the value of the job ID is displayed in a first row 621. In a row 623, the name of a printer, i.e., the name of the production system 120 is displayed. In a row 624, whether the barcode inspection is required is displayed. In a row 625, whether the image defect inspection is required is displayed. As with FIG. 10, "Implementation Required" is displayed if each inspection needs to be implemented in the offline mode, "Inline Implementation" is displayed if each inspection needs to be implemented in the inline mode, and "Implementation Not Required" is displayed if each inspection is not required. In the rows 624 to 627, since the results of determinations specifically described in the flowchart illustrated in FIGS. 12A and 12B (described below) are stored in the data management unit 301, the results are read and displayed in the rows 624 to 627 by the integrated control unit 302.

With regard to the row (image defect) 625, if the defect types, e.g., the hickey and the streak, are stored in the data management unit 301 as a result of the determinations specifically described in the flowchart illustrated in FIGS. 12A and 12B (described below), the defect types may be read by the integrated control unit 302. Then, the hickey is displayed as in the row (character string) 626. The streak is displayed as in the row (character string) 627. In this case, the example of the inspection instruction sheet illustrated in FIG. 11A displays only "Implementation Required" indicating that each inspection needs to be implemented in the offline mode. Since the quality checker refers to the inspection instruction sheet when performing an offline inspection, the format of the inspection instruction sheet displays only the offline inspection items.

The row 621 indicating the value of the job ID enables the quality checker to input the job ID simply by scanning the barcode to associate the job ID with the inspection result when performing an offline inspection. This eliminates the need of manually inputting the job ID.

FIG. 11B illustrates another example of an inspection instruction sheet generated by the workflow management server 100.

An inspection instruction sheet 630 displays inspection items common to those illustrated in FIG. 11A, from the row 621 indicating the value of the job ID as a barcode to the row (streak) 627. In addition to these items, a row 628 indicates the necessity of the tint inspection, and a row 629 indicates the necessity of the positional shift inspection. As with FIG. 10, "Implementation Required" is displayed if each inspection needs to be implemented in the offline mode, "Inline Implementation" is displayed if each inspection needs to be implemented in the inline mode, and "Implementation Not Required" is displayed if each inspection is not required. With regard to values to be indicated in the rows 624 to 629, since the results of determinations specifically described in the flowchart illustrated in FIGS. 12A and 12B (described below) are stored in the data management unit 301, the results are read and displayed in the rows 624 to 629 by the integrated control unit 302.

In this case, the example of the inspection instruction sheet illustrated in FIG. 11B displays not only "Implementation Required" indicating that each inspection needs to be implemented in the offline mode but also "Inline Implementation" indicating that each inspection needs to be implemented in the inline mode and "Implementation Not Required" indicating that each inspection is not required. When the operator needs to monitor not only an offline inspection but also an inline inspection and the entire process, the operator needs to recognize all of inspections. Thus, the format enables the operator to understand at a glance which inspection is required and which is not required.

Figure 12B:
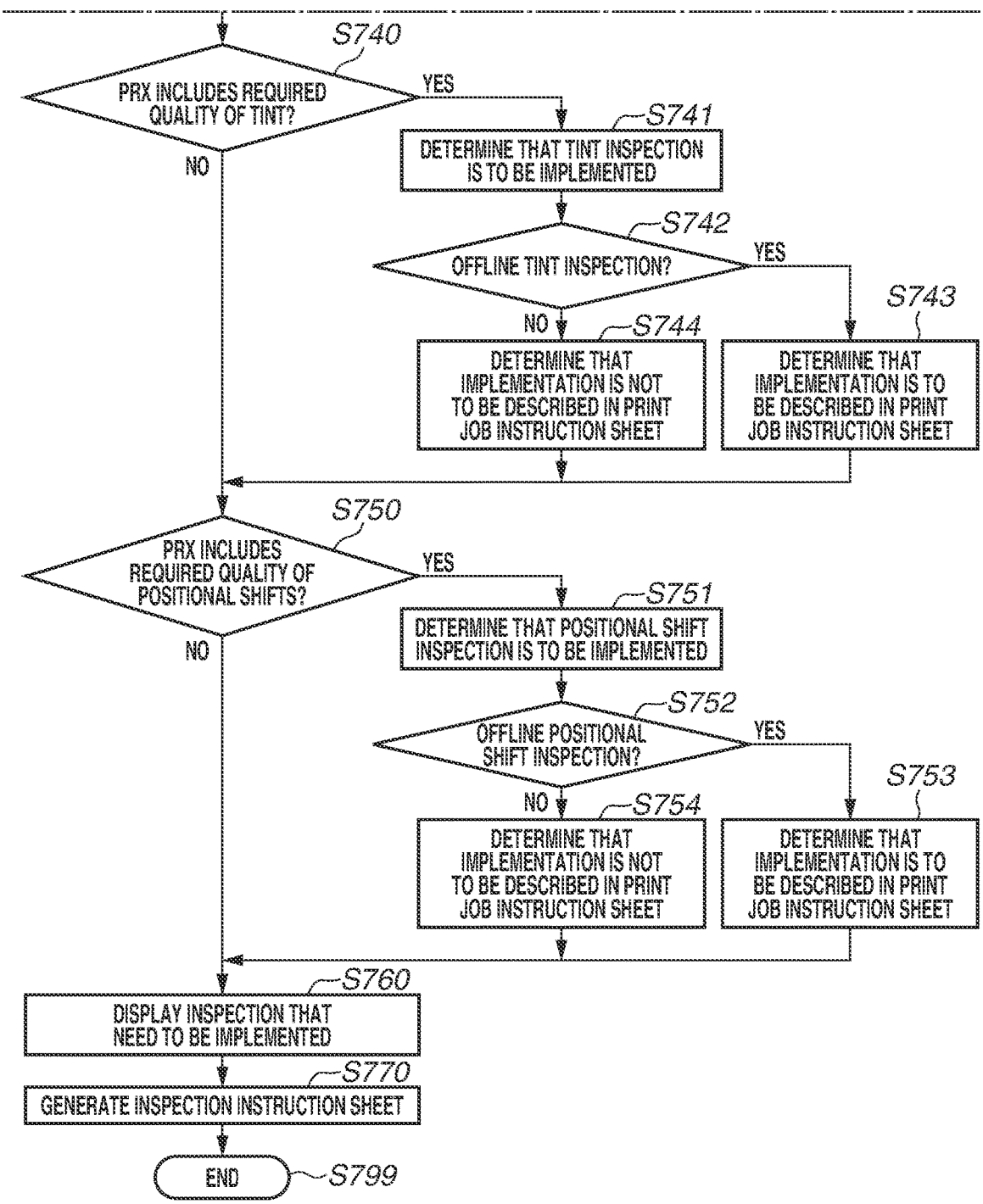

FIGS. 12A and 12B is a flowchart illustrating an operation flow of the workflow management server 100. The flowchart is implemented by the CPU 201 reading a program stored in the ROM 202 or the HDD 204 and loading the program into the RAM 203 and then executing the program.

When the workflow management server 100 receives PRX and print data from the order reception system server 110, in step S700, the processing in the flowchart starts.

The integrated control unit 302 stores a print job including the received PRX and print data in the data management unit 301, and transmits the print data to the prepress processing unit 304 and PRX to the PRX interpretation unit 303. In step S701, the integrated control unit 302 acquires an ID of the print job. In step S702, the integrated control unit 302 identifies the production system 120 suitable for processing the print job, as described above with reference to FIG. 1. The integrated control unit 302 stores the ID of the acquired print job and the name of the identified production system 120 in the data management unit 301. In step S710, the PRX interpretation unit 303 analyzes the received PRX.

First, the CPU 201 determines whether a barcode inspection is required. In step S720, the workflow management server 100 determines whether PRX includes a required print quality of barcodes. If the required print quality exists (YES in step S720), the processing proceeds to step S721. On the other hand, if the required print quality does not exist (NO in step S720), the processing proceeds to step S730. In step S730, the workflow management server 100 determines that the inspection is not required and stores "Implementation Not Required" in the data management unit 301. In step S720, the workflow management server 100 performs a search by using a PRX tag as a key to determine whether the required print quality exists. More specifically, the workflow management server 100 searches for the tag Barcode 418. If the tag Barcode 418 is found, the workflow management server 100 further searches for the tag MinimumAcceptableRank 454 and the tag DesiredRank 455 in the tag BarcodeScore 452 and the tag ScoringInfo 453. If the tags 454 and 455 are found, the workflow management server 100 determines that the required print quality of barcodes exists. Then, the workflow management server 100 acquires a rank value for each of the tags. The workflow management server 100 further searches for the tag BarcodeSymbology 459 under the tag BarcodeParameter 458 and acquires the type of the barcode. Then, the integrated control unit 302 of the workflow management server 100 stores the result of determination on whether the required print quality exists and the values acquired in this processing in the data management unit 301.

In step S721, the integrated control unit 302 determines that the barcode inspection is to be implemented. Then, the processing proceeds to step S722. In step S722, the integrated control unit 302 checks whether the barcode inspection apparatus is connected with the production system 120 by using a communication protocol such as Simple Network Management Protocol (SNMP). As a result of the check, if the barcode inspection apparatus is determined to be unconnected with the production system 120, i.e., an offline inspection is to be performed (YES in step S722), the processing proceeds to step S723. On the other hand, if the barcode inspection apparatus is determined to be connected with the production system 120, i.e., the offline inspection is not to be performed (NO in step S722), the processing proceeds to step S724. In step S723, the integrated control unit 302 determines that implementation of the barcode inspection by using an offline barcode inspection apparatus is to be described in a print job instruction sheet. In step S724, the integrated control unit 302 determines that the implementation of the barcode inspection by using an inline barcode inspection apparatus is not to be described in the print job instruction sheet. In this processing, the integrated control unit 302 does not issue an instruction for not implementing the barcode inspection by using the inline barcode inspection apparatus. Note that the quality checker does not describe the implementation of the barcode inspection in the print job instruction sheet because, although the processing implements the barcode inspection, the inspection does not need to be manually performed because the inline barcode inspection apparatus is connected with the production system 120 in the inline mode. When the integrated control unit 302 determines that the inline inspection is to be performed, it determines the inspection as "Inline Implementation" and stores "Inline Implementation" in the data management unit 301. When the integrated control unit 302 determines that the offline inspection is to be performed, it determines that the inspection is to be performed by "Implementation Required" and stores "Implementation Required" in the data management unit 301. After completion of the processing in steps S723 and S724, the processing proceeds to step S730.

Then, the CPU 201 determines whether an image defect inspection is required. In step S730, the workflow management server 100 determines whether PRX includes the required print quality of image defects. If the required print quality exists (YES in step S730), the processing proceeds to step S731. On the other hand, if the required print quality does not exist (NO in step S730), the processing proceeds to step S740. In this case, the workflow management server 100 determines the inspection as "Implementation Not Required" and stores "Implementation Not Required" in the data management unit 301. In step S730, the workflow management server 100 performs a search by using the PRX tag as a key to determine whether the required print quality exists. More specifically, the workflow management server 100 searches for the tag Defects 417. If the tag Defects 417 is found, the workflow management server 100 further searches for the tag MinimumAcceptableRank 442 and the tag DesiredRank 443 under the tag ScoringInfo 441. If the tags 442 and 443 are found, the workflow management server 100 determines that the required print quality of image defects exists. Then, the workflow management server 100 acquires a rank value for each of the tags. The workflow management server 100 further searches for all types of image defects defined by the tag DefectName 445 under the tag DefectTypeDefinition 444 and acquires the type of image defects. The example illustrated in FIG. 7 indicates that the required print quality for the hickey and the line exist. These are displayed as the defect types to be inspected in the image defect inspection in steps S760 and S770 (described below). Then, the integrated control unit 302 of the workflow management server 100 stores the result of the determination on whether the required print quality exists and the values acquired in this processing in the data management unit 301.

In step S731, the integrated control unit 302 determines that the image defect inspection is to be implemented. Then, the processing proceeds to step S732. In step S732, the integrated control unit 302 checks whether an image defect inspection apparatus is connected with the production system 120 by using a communication protocol such as SNMP. For example, if the quality checker visually performs the image defect inspection, the production system 120 notifies the integrated control unit 302 that the image defect inspection apparatus is unconnected. As a result of the check, if the image defect inspection apparatus is determined to be unconnected with the production system 120 i.e., the offline inspection is to be performed (YES in step S732), the processing proceeds to step S733. On the other hand, if the image defect inspection apparatus is determined to be connected with the production system 120, i.e., the offline inspection is not to be performed (NO in step S732), the processing proceeds to step S734. In step S733, the integrated control unit 302 determines that implementation of the offline image defect inspection is to be described (i.e., the quality checker visually performs the inspection) in the print job instruction sheet. In step S734, the integrated control unit 302 determines that the implementation of the image defect inspection by using an inline image defect inspection apparatus is not to be described in the print job instruction sheet. In this processing, the integrated control unit 302 does not issue an instruction for not implementing the image defect inspection by using the inline image defect inspection apparatus. Note that the quality checker does not describe the implementation of the image defect inspection in the print job instruction sheet because, although the processing implements the image defect inspection, the inspection does not need to be manually performed because the inline image defect inspection apparatus is connected with the production system 120 in the inline mode. When the integrated control unit 302 determines that the inline inspection is to be performed, it determines that the inspection is to be performed by "Inline Implementation" and stores "Inline Implementation" in the data management unit 301. When the integrated control unit 302 determines that the offline inspection is to be performed, it determines as "Implementation Required" and stores "Implementation Required" in the data management unit 301. After completion of the processing in steps S733 and S734, the processing proceeds to step S740.

Then, the CPU 201 determines whether a tint inspection is required. In step S740, the workflow management server 100 determines whether PRX includes the required print quality of tint. If the required print quality exists (YES in step S740), the processing proceeds to step S741. On the other hand, if the required print quality does not exist (NO in step S740), the processing proceeds to step S750. In this case, the workflow management server 100 determines the inspection as "Implementation Not Required" and stores "Implementation Not Required" in the data management unit 301. In step S740, the workflow management server 100 performs a search by using the PRX tag as a key to determine whether the required print quality exists. More specifically, the workflow management server 100 searches for the tag Color 415. If the tag Color 415 is found, the workflow management server 100 further searches for the tag MinimumAcceptableRank 424 and the tag DesiredRank 425 under the configuration of the tag ColorScore 422 and the tag ScoringInfo 423. If the tags 424 and 425 are found, the workflow management server 100 determines that the required print quality of tint exists. Then, the workflow management server 100 acquires a rank value for each of the tags. The workflow management server 100 further acquires the target color standard defined by the tag ComplianceGoal 421. In this example, "G7" is acquired. Then, the integrated control unit 302 of the workflow management server 100 stores the result of the determination on whether the required print quality exists and the values acquired in this processing in the data management unit 301.

In step S741, the integrated control unit 302 determines that the tint inspection is to be implemented. Then, the processing proceeds to step S742. In step S742, the integrated control unit 302 checks whether a tint inspection apparatus is connected with the production system 120 by using a communication protocol such as SNMP. For example, if the inline inspection apparatus 126 is connected with the production system 120, the production system 120 notifies the integrated control unit 302 that the tint inspection apparatus is connected. Alternatively, if the inline inspection apparatus 126 is unconnected and the tint inspection is to be performed by using a colorimetry represented by the it from X-Rite Inc. unconnected with the production system 120, the production system 120 notifies the integrated control unit 302 that the tint inspection apparatus is unconnected. As a result of the check, if the tint inspection apparatus is determined to be unconnected with the production system 120 i.e., the offline inspection is to be performed (YES in step S742), the processing proceeds to step S743. On the other hand, if the tint inspection apparatus is determined to be connected with the production system 120, i.e., the offline inspection is not to be performed (NO in step S742), the processing proceeds to step S744. In step S743, the integrated control unit 302 determines that implementation of the offline tint inspection is to be described (i.e., the quality checker performs the inspection by using the i1) in the print job instruction sheet. In step S744, the integrated control unit 302 determines that the implementation of the tint inspection by using the inline inspection apparatus 126 is not to be described in the print job instruction sheet. In this processing, the integrated control unit 302 does not issue an instruction for not implementing the tint inspection by using the inline inspection apparatus 126. Note that the quality checker does not describe the implementation of the tint inspection in the print job instruction sheet because, although the processing implements the tint inspection, the inspection does not need to be manually performed because the inline inspection apparatus 126 is connected with the production system 120 in the inline mode. When the integrated control unit 302 determines that the inline inspection is to be performed, it determines as "Inline Implementation" and stores "Inline Implementation" in the data management unit 301. When the integrated control unit 302 determines that the offline inspection is to be performed, it determines as "Implementation Required" and stores "Implementation Required" in the data management unit 301. After completion of the processing in steps S743 and S744, the processing proceeds to step S750.

Then, the CPU 201 determines whether a positional shift inspection is required. In step S750, the workflow management server 100 determines whether PRX includes the required print quality of positional shifts. If the required print quality exists (YES in step S750), the processing proceeds to step S751. On the other hand, if the required print quality does not exist (NO in step S750), the processing proceeds to step S760. In this case, the workflow management server 100 determines the inspection as "Implementation Not Required" and stores "Implementation Not Required" in the data management unit 301. In step S750, the workflow management server 100 performs a search by using the PRX tag as a key to determine whether the required print quality exists. More specifically, the workflow management server 100 searches for the tag Registration 416. If the tag Registration 416 is found, the workflow management server 100 further searches for the tag MinimumAcceptableRank 433 and the tag DesiredRank 434 under the tag RegistrationScore 431 and the tag ScoringInfo 432. If the tags 433 and 434 are found, the workflow management server 100 determines that the required print quality of positional shifts exists. Then, the workflow management server 100 acquires a rank value for each of the tags. The workflow management server 100 further acquires a definition of the length of a positional shift for each rank, as with the tag ParameterScore 437 and the tag ParameterScore 43f. Then, the integrated control unit 302 of the workflow management server 100 stores the result of the determination on whether the required print quality exists and the values acquired in this processing in the data management unit 301.

In step S751, the integrated control unit 302 determines that the positional shift inspection is to be implemented. Then, the processing proceeds to step S752. In step S752, the integrated control unit 302 checks whether a positional shift inspection apparatus is connected with the production system 120 by using a communication protocol such as SNMP. For example, if the inline inspection apparatus 126 is connected with the production system 120, the production system 120 notifies the integrated control unit 302 that the positional shift inspection apparatus is connected. Alternatively, if the quality checker measures the length of a positional shift by using a measuring device such as a micrometer with reference to position marks such as register marks, the production system 120 notifies the integrated control unit 302 that the positional shift inspection apparatus is unconnected. As a result of the check, if the positional shift inspection apparatus is determined to be unconnected with the production system 120 i.e., the offline inspection is to be performed (YES in step S752), the processing proceeds to step S753. On the other hand, if the positional shift inspection apparatus is determined to be connected with the production system 120, i.e., the offline inspection is not to be performed (NO in step S752), the processing proceeds to step S754. In step S753, the integrated control unit 302 determines that the implementation of the offline positional shift inspection is to be described (i.e., the quality checker measures the positional shift) in the print job instruction sheet. In step S754, the integrated control unit 302 determines that the implementation of the positional shift inspection by using the inline inspection apparatus 126 is not to be described in the print job instruction sheet. In this processing, the integrated control unit 302 does not issue an instruction for not implementing the positional inspection by using the inline inspection apparatus 126. Note that the quality checker does not describe the implementation of the positional shift inspection in the print job instruction sheet because, although the processing implements the positional shift inspection, the inspection does not need to be manually performed because the inline inspection apparatus 126 is connected with the production system 120 in the inline mode. When the integrated control unit 302 determines that the inline inspection is to be performed, it determines as "Inline Implementation" and stores "Inline Implementation" in the data management unit 301. When the integrated control unit 302 determines that the offline inspection is to be performed, it determines as "Implementation Required" and stores "Implementation Required" in the data management unit 301. After completion of the processing in steps S753 and S754, the processing proceeds to step S760.

When the CPU 201 determines the necessity of the above-described four inspections, the CPU 201 notifies the operator and the quality checker of the result of the determination.

In step S760, the workflow management server 100 generates the inspection list screen illustrated in FIG. 10 by using the values stored in the data management unit 301 by the integrated control unit 302. The workflow management server 100 acquires the job ID stored in step S701 and the name of the production system 120 stored in step S702 from the PRX interpretation unit 303, and then displays the job ID and the name in the rows 611 and 612 on the inspection list screen, respectively. The workflow management server 100 further acquires the result of the determination in the barcode inspection stored in steps S720 to S724 from the PRX interpretation unit 303, and displays one of "Implementation Required", "Inline Implementation", and "Inspection Not Required" in the row 613 on the inspection list screen. The workflow management server 100 acquires the result of the determination in the image defect inspection stored in steps S730 to S734 from the PRX interpretation unit 303, and displays one of "Implementation Required", "Inline Implementation", and "Implementation Not Required" in the row 614 on the inspection list screen. The workflow management server 100 acquires the result of the determination in the tint inspection stored in steps S740 to S744 from the PRX interpretation unit 303, and displays one of "Implementation Required", "Inline Implementation", and "Implementation Not Required" in the row 615 on the inspection list screen. The workflow management server 100 acquires the result of determination in the positional shift inspection stored in steps S750 to S754 from the PRX interpretation unit 303, and displays one of "Implementation Required", "Inline Implementation", and "Implementation Not Required" in the sixth row 616 on the inspection list screen. In this way, the workflow management server 100 generates the inspection list screen.

Although not illustrated in FIG. 10, if necessary, the integrated control unit 302 may read the hickey and the streak stored in the data management unit 301 in the image defect inspection and may display the information as detailed information in the row 614.

In step S770, the workflow management server 100 generates the inspection instruction sheet illustrated in FIG. 11A or 11B by using the values stored in the data management unit 301 by the integrated control unit 302. The workflow management server 100 acquires the job ID stored in step S701 and the name of the production system 120 stored in step S702 from the PRX interpretation unit 303, and then displays the job ID and the name in the rows 622 and 623 on the inspection list screen. The integrated control unit 302 converts the value of the row (job ID) 622 into a barcode image and displays the barcode image in the row (barcode) 621. The workflow management server 100 further acquires the result of the determination in the barcode inspection stored in steps S720 to S724 from the PRX interpretation unit 303, and displays one of "Implementation Required", "Inline Implementation", and "Implementation Not Required" in the row 624 on the inspection list screen. The workflow management server 100 acquires the result of the determination in the image defect inspection stored in steps S730 to S734 from the PRX interpretation unit 303, and displays one of "Implementation Required", "Inline Implementation", and "Implementation Not Required" in the row 625 on the inspection list screen. Then, the integrated control unit 302 reads the hickey and the streak stored in the data management unit 301 and then displays the information in the rows 626 and 627 on the inspection list screen. The workflow management server 100 acquires the result of the determination in the tint inspection stored in steps S740 to S744 from the PRX interpretation unit 303, and displays one of "Implementation Required", "Inline Implementation", and "Implementation Not Required" in the row 628 on the inspection list screen. The workflow management server 100 acquires the result of the determination in the positional shift inspection stored in steps S750 to S754 from the PRX interpretation unit 303, and displays one of "Implementation Required", "Inline Implementation", and "Implementation Not Required" in the row 629 on the inspection list screen. In a case where the inspection instruction sheet is generated in the format illustrated in FIG. 11A, the workflow management server 100 displays only inspection items with "Implementation Required". In a case where the inspection instruction sheet is generated in the format illustrated in FIG. 11B, the workflow management server 100 displays not only the inspection items with "Implementation Required" but also inspection items with "Inline Implementation" and "Implementation Not Required". The workflow management server 100 generates the inspection instruction sheet in this way.

After the inspection instruction sheet is generated, the workflow management server 100 prints the inspection instruction sheet afterwards at a suitable timing. For example, in a certain printing operation flow, the quality checker picks up a printed output product subjected to the offline inspection from an output tray of the production system 120 after printing, carries the printed output product to the inspection site, and implements the inspection. In that case, the working efficiency will be improved if the quality checker can immediately determine the necessity of inspections by viewing the printed output product. Thus, if the inspection instruction sheet is printed on the first output page of the printed output product as a so-called banner page, the quality checker can determine the necessity of the offline inspection at a glance at the inspection instruction sheet at the top. In the printing operation flow, the workflow management server 100 transmits electronic data of the generated inspection instruction sheet to the production system 120 and instructs the production system 120 to print the inspection instruction sheet as the banner page.

Alternatively, depending on a case, first, the inspection instruction sheet for one print job may be printed, and then, the inspection instruction sheet may be transferred to each process, thus proceeding with the printing operation. In this case, first, in step S770, the workflow management server 100 prints the inspection instruction sheet. When the inspection instruction sheet is read by the production system 120, the job corresponding to the row (job ID) 622 in the inspection instruction sheet is printed, and the inline inspection is implemented at the same time by the inline inspection apparatus 126. Then, the inspection instruction sheet is included in the printed output product printed by the production system 120, and then the printed output product is carried to the offline inspection site. On the inspection site, the quality checker implements the offline inspection according to the inspection instruction sheet. In this way, the inspection instruction sheet is printed at a suitable timing depending on the printing operation flow.

When the workflow management server 100 generates the inspection instruction sheet in step S770, then in step S799, the processing in the flowchart ends.

In the flowchart illustrated in FIGS. 12A and 12B, the order of steps S720, S730, S740, and S750 is not limited to this order. Further, the display order of the barcode, the image defect, the tint, and the positional shift inspections illustrated in FIGS. 10, 11A, and 11B is not limited to this order. It is important to set an order that makes it easier for the operator and the quality checker to perform their operations.

A method for notifying a user of results of implementing the above-described inspections in the PQX format will be briefly described below. The PQX format is the format illustrated in FIG. 5. When the barcode inspection is implemented by the barcode inspection apparatus, the user views the inspection result and then inputs inspection result data to the workflow management server 100. The workflow management server 100 stores the inspection result data in association with the row (job ID) 622 in the data management unit 301. The integrated control unit 302 converts the stored inspection result data of the barcode inspection apparatus into the PQX format. The workflow management server 100 also stores other inspection result data of image defect, tint, and positional shift in the data management unit 301, and the integrated control unit 302 converts the stored inspection result data into the PQX format.

The inspection result data can be converted into the PQX format in this way.

As discussed above, the commercial printing system according to the present exemplary embodiment analyzes the print quality requirement criterion in the PRX format to determine which inspection is required. In particular, the commercial printing system can determine which inspection is required as the offline inspection that cannot be implemented in the production system 120. Then, by displaying the inspection on a screen of the workflow management server 100 and in an inspection instruction sheet, the quality checker in charge of the offline inspection can easily implement the inspection.

In the above-described exemplary embodiment, a printed product output by the printing apparatus 121 is an example of job processing. However, the job processing is not limited to this and may also be post-processing by the post-processing apparatus. Examples of the post-processing apparatus include an offline bookbinding apparatus and a cutting apparatus. As the post-processing, the offline bookbinding apparatus supplies a body set by the operator, puts glue on the spine of the body, and performs processing for wrapping the body with a cover.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-040216, filed Mar. 9, 2020, which is hereby incorporated by reference herein in its entirety.

What is claimed is:

1. An information processing apparatus that communicates with an external apparatus and a job processing apparatus, the information processing apparatus comprising:
at least one processor or at least one circuit that causes the information processing apparatus to function as:
a receiving unit that receives, from the external apparatus, a job and required quality data for requiring quality of an output product output by executing the job by the job processing apparatus;
an analyzing unit that analyzes the required quality data received by the receiving unit;
a notification unit that notifies, based on an analysis result of the required quality data analyzed by the analyzing unit, a user that an output product output by executing the job needs to be inspected by an inspection apparatus which is different from the job processing apparatus;
an accepting unit that accept, from the user, an inspection result of inspection by the inspection apparatus;
a generating unit that generates a report based on the inspection result accepted by the accepting unit; and
a transmitting unit that transmits the report to the external apparatus.

2. The information processing apparatus according to claim 1,
wherein the information processing apparatus transmits the job to the job processing apparatus via a network to cause the job processing apparatus to execute the job, and
wherein the inspection apparatus is an inspection apparatus unconnected with the network.

3. The information processing apparatus according to claim 1, wherein the at least one processor or the at least one circuit causes the information processing apparatus to function as:
a determination unit configured to determine whether the inspection apparatus is an inspection apparatus connected with a network or an inspection apparatus unconnected with the network,
wherein, in a case where the inspection apparatus is determined to be the inspection apparatus unconnected with the network by the determination unit, the notification unit notifies the user that the output product output by executing the job needs to be inspected by the inspection apparatus unconnected with the network, and
wherein, in a case where the inspection apparatus is determined not to be the inspection apparatus unconnected with the network by the determination unit, the notification unit does not notify the user that the output product output by executing the job needs to be inspected by the inspection apparatus unconnected with the network.

4. The information processing apparatus according to claim 1, wherein the notification unit notifies the user that the output product output by executing the job needs to be inspected by the inspection apparatus which is different from the job processing apparatus, by printing information indicating necessity of an inspection.

5. The information processing apparatus according to claim 1, wherein the notification unit notifies the user that the output product output by executing the job needs to be inspected by the inspection apparatus which is different from the job processing apparatus, by displaying information indicating necessity of an inspection.

6. The information processing apparatus according to claim 1, wherein the notification unit notifies the user of identification information of the job and that the output product output by executing a job identified by the identification information needs to be inspected by the inspection apparatus which is different from the job processing apparatus, and
wherein the information processing apparatus stores the report in association with the identification information.

7. The information processing apparatus according to claim 1, wherein a format of the required quality data is Print Requirement eXchange (PRX) format, and
wherein a format of the report is Print Quality eXchange (PQX) format.

8. The information processing apparatus according to claim 1,
wherein the inspection apparatus is an apparatus configured to inspect a barcode, and
wherein, based on the analysis result of the required quality data, the notification unit notifies the user that a barcode printed on the output product output by executing the job needs to be inspected by the inspection apparatus which is different from the job processing apparatus.

9. The information processing apparatus according to claim 1, wherein a format of the required quality data is Print Requirement eXchange (PRX).

10. The information processing apparatus according to claim 1, wherein the job is a print job.

11. A method for controlling an information processing apparatus that communicates with an external apparatus and a job processing apparatus, the method comprising:
receiving, from the external apparatus, a job and required quality data for requiring quality of an output product output by executing the job by the job processing apparatus;
analyzing the required quality data that is received;
notifying, based on an analysis result of the required quality data, a user that an output product output by executing the job needs to be inspected by an inspection apparatus which is different from the job processing apparatus;

accepting, from the user, an inspection result of inspection by the inspection apparatus;

generating a report based on the inspection result; and transmitting the report to the external apparatus.

12. The method for controlling the information processing apparatus according to claim 11, wherein the information processing apparatus transmits the job to the job processing apparatus via a network to cause the job processing apparatus to execute the job, and wherein the inspection apparatus is an inspection apparatus unconnected with the network.

13. The method for controlling the information processing apparatus according to claim 11, further comprising determining whether the inspection apparatus is an inspection apparatus connected with a network or an inspection apparatus unconnected with the network, wherein, in a case where the inspection apparatus is determined to be the inspection apparatus unconnected with the network in the determining, the user is notified, in the notifying, that the output product output by executing the job needs to be inspected by the inspection apparatus unconnected with the network, and wherein, in a case where the inspection apparatus is determined not to be the inspection apparatus unconnected with the network in the determining, the user is not notified, in the notifying, that the output product output by executing the job needs to be inspected by the inspection apparatus unconnected with the network.

14. The method for controlling the information processing apparatus according to claim 11, wherein the user is notified, in the notifying, that the output product output by executing the job needs to be inspected by the inspection apparatus, by printing information indicating necessity of an inspection.

15. The method for controlling the information processing apparatus according to claim 11, wherein the user is notified, in the notifying, that the output product output by executing the job needs to be inspected by the inspection apparatus which is different from the job processing apparatus, by displaying information indicating necessity of an inspection.

16. The method for controlling the information processing apparatus according to claim 11, wherein the user is notified, in the notifying, of identification information of the job and that the output product output by executing a job identified by the identification information needs to be inspected by the inspection apparatus which is different from the job processing apparatus, and wherein the report is stored in association with the identification information in the information processing apparatus.

17. The method for controlling the information processing apparatus according to claim 11, wherein a format of the required quality data is Print Requirement eXchange (PRX) format, and wherein a format of the report is Print Quality eXchange (PQX) format.

18. The method for controlling the information processing apparatus according to claim 11, wherein the inspection apparatus is an apparatus configured to inspect a barcode, and wherein, based on the required quality data received in the receiving, the user is notified, in the notifying, that a barcode printed on the output product output by executing the job needs to be inspected by the inspection apparatus which is different from the job processing apparatus.

19. The method for controlling the information processing apparatus according to claim 11, wherein a format of the required quality data is Print Requirement eXchange (PRX).

20. A non-transitory computer-readable storage medium storing a program for causing a computer to execute a method for controlling an information processing apparatus that communicates with an external apparatus and a job processing apparatus, the method comprising:

receiving, from the external apparatus, a job and required quality data for requiring quality of an output product output by executing the job by the job processing apparatus;

analyzing the required quality data that is received;

notifying, based on an analysis result of the required quality data, a user that an output product output by executing the job needs to be inspected by an inspection apparatus which is different from the job processing apparatus;

accepting, from the user, an inspection result of inspection by the inspection apparatus;

generating a report based on the inspection result; and transmitting the report to the external apparatus.

* * * * *